United States Patent
Coleman

[11] Patent Number: 5,737,088
[45] Date of Patent: Apr. 7, 1998

[54] NON UNIFORM MODIFICATION OF PROCESS BLACK COLORANTS TO ACHIEVE CONFLICTING QUALITY REQUIREMENTS

[75] Inventor: Robert M. Coleman, Altadena, Calif.

[73] Assignee: Xerox Corporation, Stamford, Conn.

[21] Appl. No.: 653,180

[22] Filed: May 24, 1996

[51] Int. Cl.$^6$ .............................. H04N 1/23; H04N 1/46; G03F 3/08
[52] U.S. Cl. ........................ 358/296; 358/518; 358/520
[58] Field of Search ....................... 358/296, 298, 358/464, 501, 515, 517, 518, 520, 529, 530, 538; 382/162, 164, 167; 399/39, 40, 41

[56] References Cited

U.S. PATENT DOCUMENTS

| | | | |
|---|---|---|---|
| 4,500,919 | 2/1985 | Schreiber | 358/518 |
| 5,315,416 | 5/1994 | Taniuchi et al. | 358/520 X |
| 5,402,253 | 3/1995 | Seki | 358/520 X |

*Primary Examiner*—Eric Frahm
*Attorney, Agent, or Firm*—Robert Cunha

[57] ABSTRACT

A digital color printing method is described for printing process black color over a background color, which modifies individual values of the process colors in a process black independent of other process colors whenever the black colorant is sufficiently opaque. An example described which controls excess total colorant in a process black while simultaneously controlling misregistration fringes, a result which is not possible with the standard approach of modifying all process colors uniformly. The result is obtained by preferentially reducing the process colorant value with the highest luminance instead of reducing all process colorants uniformly.

In certain printing systems, printing problems can occur when process black, composed of a mixture of colorants such as cyan, magenta, yellow, and black (CMYK), is printed over a color background. For example, in a xerographic color printing system, a process black containing black plus all process colorants at maximum or near-maximum value can sometimes produce objectionable deletions in a surrounding color field, because the excessive toner height of the foreground process black interferes with the transfer of toner in the surrounding background color. However, solving the excess colorant problem in the standard way by reducing all process colorants uniformly can often create a significant difference in the foreground and background values of at least one process colorant, potentially causing light-colored misregistration fringes at the foreground/background edge. By instead preferentially reducing the colorant with the highest luminance, the result is controlled pile height without misregistration fringing.

6 Claims, 4 Drawing Sheets

NON UNIFORM MODIFICATION OF PROCESS BLACK COLORANTS TO ACHIEVE CONFLICTING QUALITY REQUIREMENTS

BACKGROUND OF THE INVENTION

1. Field of the Invention

The present invention relates to digital color printing in which black objects and color objects are intermixedly printed, and more particularly, in which the composition of colorants comprising each process black object is not adjusted uniformly, but rather adjusted preferentially according to differing characteristics of each process color, such as their differing levels of measured luminance.

2. Description of the Related Art

Digital color printers use a plurality of colorants, such as cyan, magenta, yellow, and black, to form images which appear to the human visual system to contain a multitude of colors. In particular, the color black may be formed in a number of ways. First, it may be formed of equal or nearly equal combinations of cyan, magenta, and yellow. Second, the black colorant may be added to combinations of cyan, magenta, and yellow colorants to increase the maximum density and maintain the neutrality of the black color. When black is formed with a mixture of process colors such as cyan, magenta, yellow, and black, it is a type of black color known as process black. Alternatively, the color black may be formed with black colorant only. In this case, it is known as single-color black.

Process black is often used in contexts in the printing process in which a high-coverage, high-density, glossy black is needed. It may be used for example when a black object is to be printed over a color background. There are several benefits to using process black in this situation instead of single-color black. First, the gloss of a process black object in general corresponds better with the gloss of the surrounding color field. Second, on certain dense color backgrounds process black is used so that its density will better correspond to the density in the background color. Third, the ink coverage or toner pile height of process black may better match that of the surrounding color background. Finally, process black can mitigate the single-color black problem of white fringing at the edges caused by misregistration between color and black separations during the printing process.

However, process black can also cause problems if the same formulation of process black is used against a variety of color backgrounds. For example, a dense process black with a large amount of colorant, which might be suitable for printing over a dense or dark color background, when printed on a light colored background can create pile height or ink coverage differences between the black object and its light colored background. This can result in printing defects such as tactile unevenness or toner deletion in the background color surrounding the black object. Conversely, a process black with smaller values of C, M, Y may be better suited for light backgrounds, but can show problems of "caving" if its total pile height is less than the height of the surrounding background for darker backgrounds.

Further, even though white fringing is improved by using process black, it is still the case that if the value of certain process colorants within a process black is significantly different than the value of the same colorant in the color background, it will still be possible to show colored fringes around the process black object due to misregistration. For example, if the background color contains 90% cyan, and the process black contains only 20% cyan, and if the black colorant is misregistered with respect to the cyan so that the black color "misses" the hole left for it in the cyan separation, a 20% cyan fringe will be seen at the edge of the black color. This fringe, while less objectionable than a white fringe caused by having zero cyan component as in a single-color black, is still visually noticeable and objectionable.

Thus, it is often not possible to specify a single process black formulation for a given printing system which has large enough CMY for printing over dark colors, small enough CMY for light colors, and contains insignificant enough differences in each separation to avoid light-colored fringing. It is therefore often desirable to adjust each process black formulation for each process black object, based on both the background color at each object and on certain printer characteristics.

However, a problem arises when the printing system has opposing constraints in determining the correct process black for a particular background color. For example, as previously mentioned, in order to avoid transfer difficulties in xerographic color printers one printer parameter may limit the allowed pile height above the background color (ie, the total amount of C+M+Y+K should not exceed the total of background colorant by a parametric amount). This constraint tends to drive the CMY content of a process black down, in order to conform to the limitation on total allowed pile height above the background color.

Another parameter, however, which seeks to limit visually objectionable light-colored fringes caused by misregistration, may do so by limiting the difference allowed between any one colorant in the background and the foreground. Since in the prior art, the value of the C, M, and Y components in a process black are kept equal or nearly equal, this parametric constraint tends to drive each of the CMY values up to a level close to the maximum of the C, M, or Y values in the background. This drives all the CMY values up uniformly, which is in opposition to the pile height constraint which attempts to pull CMY values down. In the prior art, there is no good solution to adequately addressing both conflicting constraints.

OBJECTS AND SUMMARY OF THE INVENTION

An object of the present invention is to provide a method in which individual values of a process color in a process black may be modified independent of other process color values if the black separation is sufficiently opaque.

Another object of the present invention is to provide a method by which the formulation of a process black color to be printed may be changed in a way which minimizes differences in total colorant amount between the process black color and its background color.

Another object of the present invention is to provide a method by which the formulation of a process black color to be printed may be changed in a way which limits light-colored fringing at the boundary between the process black color and its background color.

Another object of the present invention is to provide a method by which the formulation of process black color to be printed may be changed in a way which limits differences between the process black color and its background color in both total colorant amount and individual colorant amount such that both the problems of excess colorant and light-colored fringing are mitigated.

To achieve the foregoing and other objects and to overcome the shortcomings discussed above, a method is provided which changes the colorant composition of a process black color in a non-uniform way. In the prior art, the CMY contributions in a process black are kept equal or nearly equal so as to maintain the neutrality of the process black color. It is to be noted, however, that if the opacity and density of the K (black) component of a process black is sufficient, it is possible to change the CMY contributions in a process black in a non-uniform way while still maintaining a sufficiently neutral appearance in the resulting process black.

An embodiment is provided which uses the method of varying process colors non-uniformly in order to constrain both total colorant amount and individual colorant value differences. By preferentially reducing the high-luminance separation, such as yellow, it is possible to control pile height (total colorant amount) without introducing large foreground/background colorant differences in the colorants (such as cyan and magenta) in which large differences can create visible misregistration fringing.

Thus, by allowing non-uniform process color formulations of process black instead of the standard method of using equal or near equal process color values in a process black, advantages can be gained in controlling printing defects.

BRIEF DESCRIPTION OF THE DRAWINGS

The invention will be described in detail in reference to the following drawings in which like reference numerals refer to like elements and wherein.

DETAILED DESCRIPTION OF THE PREFERRED EMBODIMENTS

Figure 1:
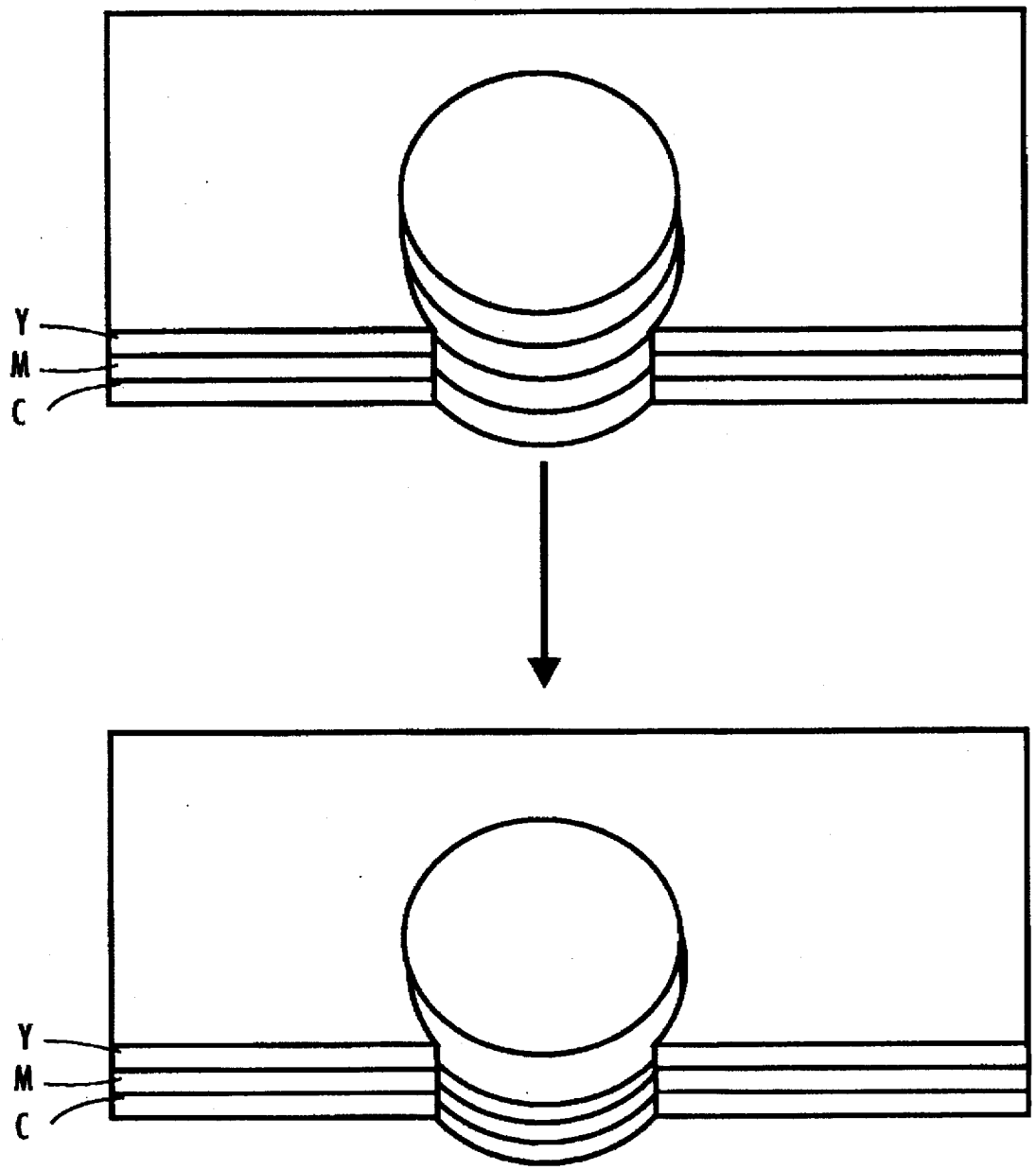
FIG. 1 shows an output in the prior art in which a process black containing uniform large amounts of cyan, magenta, and yellow (C, M, Y) toners is shown being modified to reduce the total pile height of the process black with respect to the background color, wherein each process color (C, M, Y) is reduced uniformly.

Referring now to the drawings, and particularly to FIG. 1 thereof, a process black object containing uniform large amounts of cyan, magenta, and yellow (C, M, Y) toners is shown being modified in the standard way to reduce the total pile height of the process black with respect to the background color. The standard method of reducing pile height of a process black color is to uniformly reduce the C, M, Y content of the process black until the desired pile height with respect to the background color is reached. Note that in the final configuration of process black, the C, M, Y values are approximately equal. Note, however, that the amount of C content in the process black is significantly less than the C content of the background color. Similarly, the M content and the Y content of the foreground process black is significantly less than that of the background color.

Figure 2:
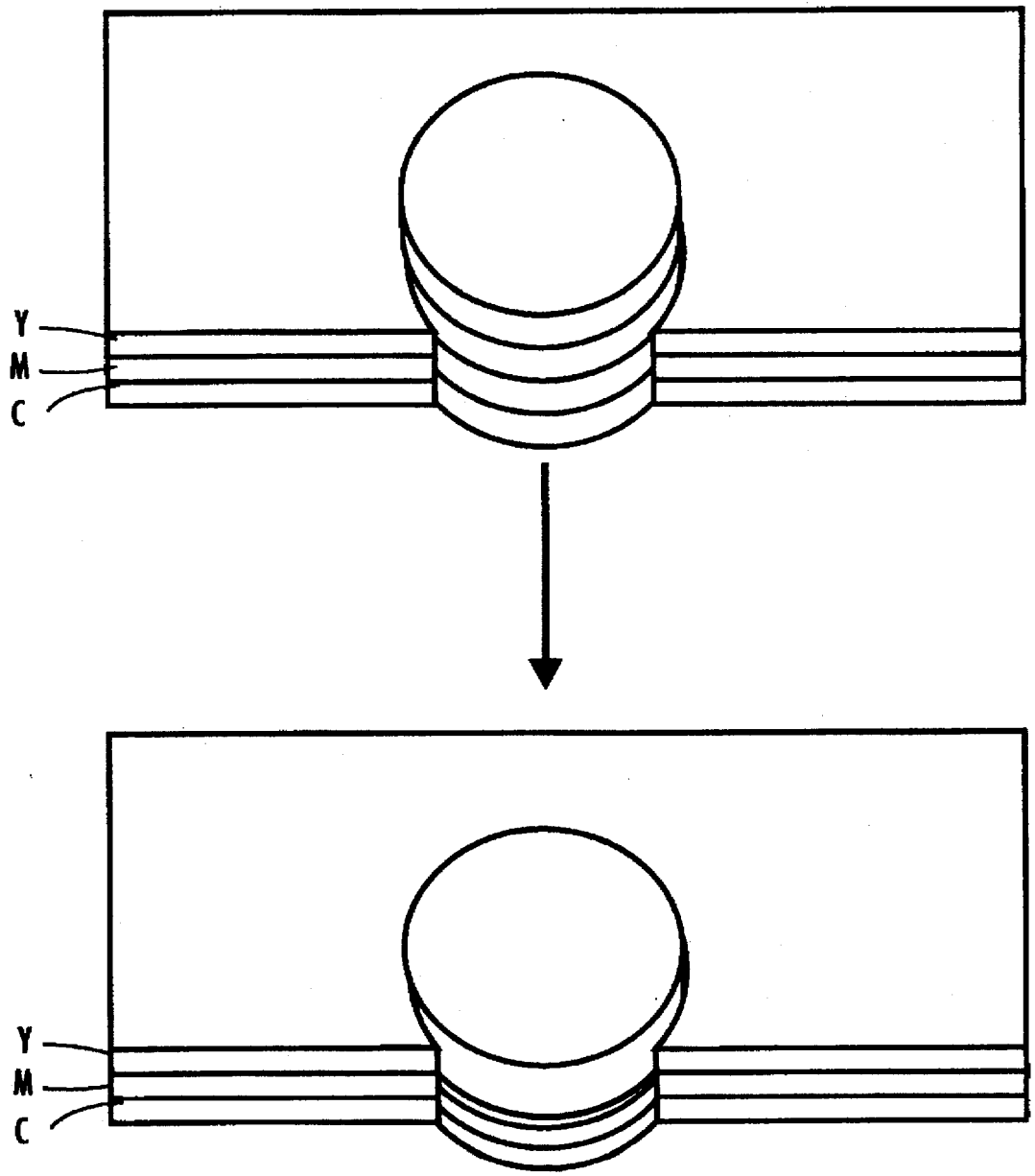
FIG. 2 shows an output according to the method of this invention in which a process black containing uniform large amounts of cyan, magenta, and yellow (C, M, Y) toners is shown being modified to reduce the total pile height of the process black with respect to the background color, wherein the process colors (C, M, Y) are non-uniformly reduced and in particular, wherein the process color with the highest luminance (yellow) is preferentially reduced.

However, FIG. 2 shows the same fixed formulation of process black, containing uniform large amounts of C, M, and Y, being modified non-uniformly according to the methods of the invention to reduce total toner height. In FIG. 2, the cyan (C) and magenta (M) content are reduced somewhat to closely match the C and M content of the background color, while the yellow (Y) colorant is severely reduced in order to control pile height. Thus, the process colors are modified non-uniformly, rather than uniformly as in the prior art.

Figure 3:
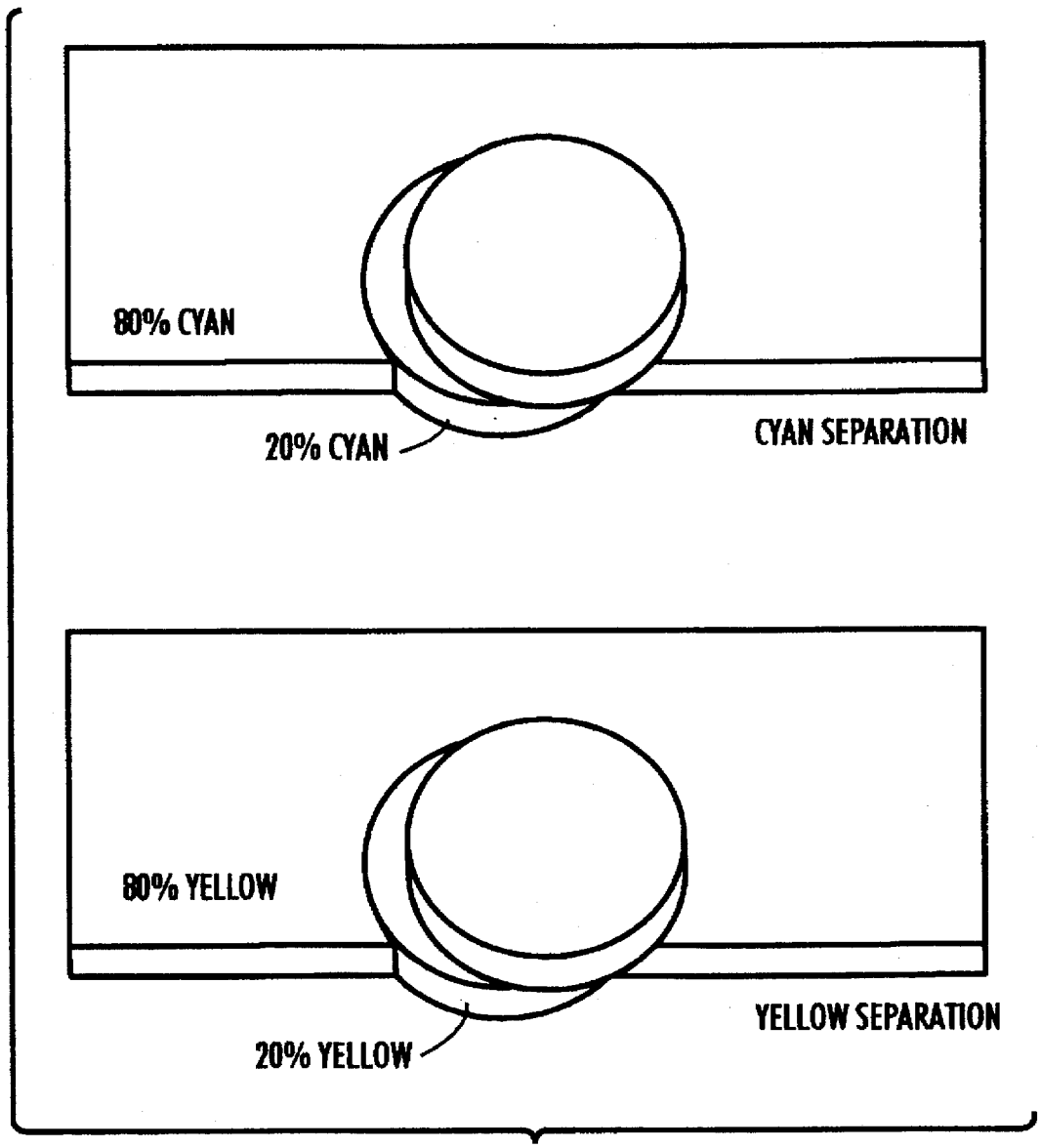
FIG. 3 shows an output example wherein an 80% to 20% change in a low-luminance separation such as cyan is shown to be much higher contrast and therefore much more visible than a similar 80% to 20% change in a high-luminance separation such as yellow.

The reason for this approach is shown in FIG. 3. In attempting to meet the constraint of limiting total pile height of a process black color, all process colors (generally C, M, and Y) contribute equally to pile height. However, it should be noted that in an attempt to limit visible light-colored fringes around a process black color in a color background, not all process colors contribute equally to a visible light-colored fringe.

For example, as shown in FIG. 3, the difference between an 80% cyan in the background color and a 20% cyan in the foreground process black is visible if the black colorant is offset due to misregistration. However, a similar 80%/20% yellow difference is not generally visible, because the luminance of the yellow separation is so high that the differences in colorant coverage is difficult for the human eye to perceive. Thus, by preferentially reducing a high-luminance separation, such as yellow, it is possible to control pile height (colorant coverage) without introducing problems of misregistration fringing.

To give a numerical example, starting with a process black with full CMYK (eg, C=M=Y=K=100 on a scale of 0 to 100), the total pile height would be 400. Assume the background color contained (C,M,Y) values of (75, 75, 100), and that it is desired to reduce the pile height of the process black to equal that of the background color, that is, a total pile height of 250.

By the standard method, all process colors would be reduced uniformly while black is maintained at full value. Thus, by the standard method, the final values would be (C, M, Y, K)=(50, 50, 50, 100), for a total pile height of 250. Note, however, that there is a significant difference in the individual amounts of cyan, magenta, and yellow in the process black vs the background color. If the black separation is misregistered with respect to either the cyan or magenta separation, the drop in value of either cyan or magenta from 75% coverage to 50% coverage may likely be visible as a thin light-colored fringe at the edge of the (misregistered) black object, as illustrated in FIG. 3.

However, by reducing the CMY content of the process black non-uniformly according to the methods of the invention, it is possible to find a solution which controls pile height without introducing a potential quality problem of misregistration fringing. For example, if the yellow separation were reduced to zero and the cyan and magenta separations reduced by only 25%, the resulting values would be (C, M, Y, K)=(75, 75, 0, 100). The total pile height is still 250, the same as the background color, but note that now there is no jump in value in the cyan and magenta separations. Thus, if the black separation is misregistered with respect to cyan and magenta, no thin light-colored fringe will show since there is no change in value of cyan or magenta across the boundary between the background color and the foreground process black. The result is that pile height has been controlled, yet a new quality problem of misregistration fringing has not been introduced.

It should be noted, of course, that a very large difference has been created in the yellow separation by the methods of this embodiment of the invention. If the black separation is misregistered with respect to yellow, will this not cause a fringe to show in the yellow separation? The answer is that because the luminance of the yellow separation approaches that of white paper, even if the yellow separation drops from 100% to zero (as in the preceeding example), creating a white fringe in the yellow separation at the edge of a (misregistered) black object, the contrast between the full yellow and the thin white fringe is so low that most observers could not note the existence of the white fringe. The human eye is very good at picking out high-contrast edges such as might occur in the cyan and magenta separations, but not good at discerning low-contrast edges. Thus, it is possible in this embodiment of the invention to use the yellow separation to control pile height without introducing misregistration fringing. Note that the K (black) separation must be dense and opaque enough to mask the non-uniform color beneath it, so that the process black object will still be observed by the human eye to be neutral black.

Figure 4:
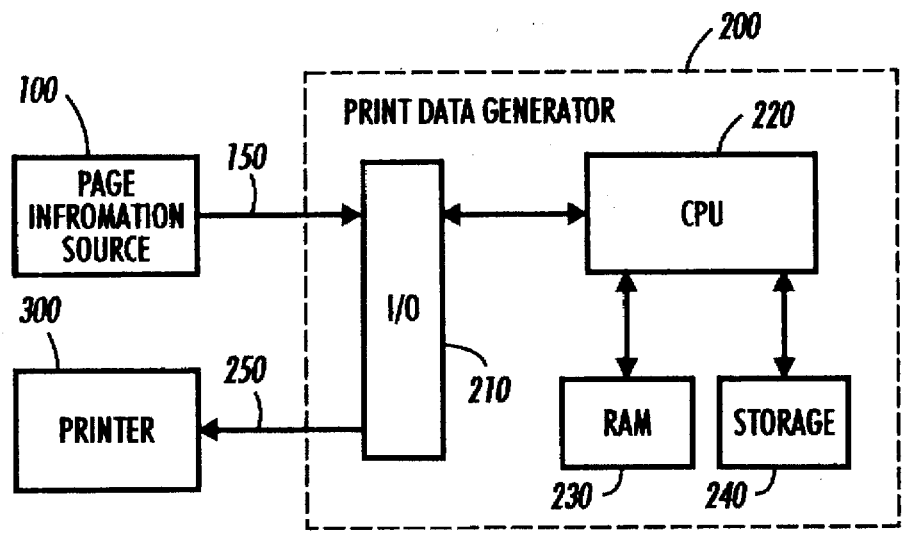
FIG. 4 is a block diagram of an apparatus made according to and for practicing the method of the invention, in which the changes to the composition of process black objects take place within the print data generator.

Referring now to FIG. 4, a generalized page printing system made according to the present invention is shown. It includes a page information source 100 connected via communication link 150 to a print data generator 200. Generator 200 is connected to a printer 300 via a communication link 250. Generator 200 includes an I/O controller 210, a CPU (central processing unit) 220, a RAM 230 which can store program and data information, and a storage apparatus 240 for non-volatile storage. These devices 210–240 may be any of a number of conventional devices generally available. Other hardware that accomplish the same functions can be used. As will be seen, various embodiments are realizable from this general structure.

Typically, page information source 100 may be a conventional workstation or other computer system such as an IBM PC or Apple Macintosh. Communication link 150 may be a part of a computer network or a dedicated link. Print data generator 200 is usually a dedicated computer attached to a printer 300 such as one of many electromechanical devices responsive to raster data for producing a printed page. Many other configurations are possible. For example, generator 200, programmed to function as described herein, could also be incorporated together in the same computer running the page source 100 software. In this case of shared computer hardware and separate software, the functions of page information source 100 and print data generator 200 remain distinct. The methods as described herein remain applicable through a wide range of apparatus configurations.

FIG. 4 shows an embodiment in which the print data generator 200 is programmed to carry out the methods described herein. In this case, a page representation is received from conventional page source 100. The page representation may be a conventional page description language such as the language available from Adobe Systems Incorporated known as PostScript, or an equivalent. In the page representation received from the page source 100, objects such as text, graphics, or pictures can be created and placed on the page in arbitrary order. The objects are defined by descriptive commands, some of which control the location, shape, orientation, and size of an object. At least one command controls the color of an object. An object's color may include neutral colors such as black and grey. Objects may overlap each other, and a priority method determines which objects are on top of other objects.

As further discussed herein, when a page representation is received from a conventional page source 100 by print data generator 200 and generator 200 is programmed to carry out the method of this invention, generator 200 may in certain situations modify the output commanded by the page representation. As described herein, generator 200 may change the formulation of a process black object contrary to the command of the page representation before merging it into the generated print data. Thus, the page as sent by a conventional page information source 100 will be printed differently than specified, in order to accomplish the objectives of this invention for improving print quality. The advantage of this configuration is that page representations received from any number and variety of conventional page sources 100 may be automatically modified by generator 200 to print with higher quality.

Figure 5:
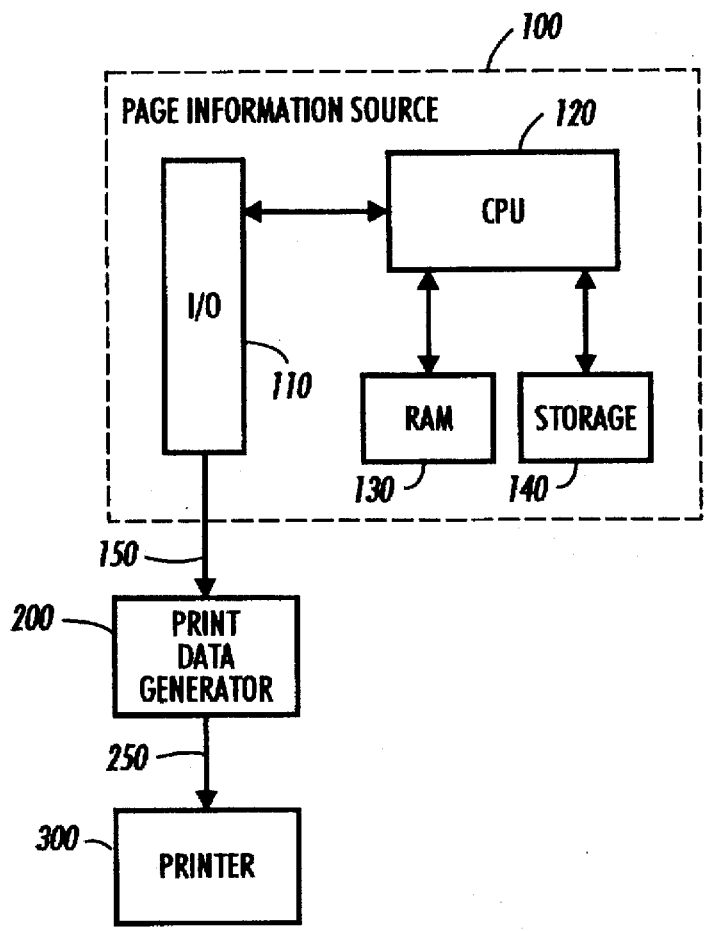
FIG. 5 is a block diagram of an apparatus made according to and for practicing the method of the invention, in which the changes to the composition of process black objects take place within the page information source.

In FIG. 5, a different apparatus and configuration is shown. In this case, the page information source 100 includes resources such as I/O controller 110, CPU 120, RAM 130, and storage 140 which allow page source 100 to be programmed to carry out the methods of the invention described herein. In this apparatus, before a page representation is sent via communication link 150 to a conventional print data generator 200, the methods of this invention are applied in order to produce a page representation which achieves the objectives of this invention by reformulating the process black objects in the image. In this configuration, the print data generator 200 may be conventional and the page information source 100 is programmed according to the methods of this invention. The advantage of this configuration of apparatus is that the page representation, which has been modified according to this invention to automatically determine a process black formula, will be printed with higher quality by any conventional print data generator 200 and printer 300.

While this invention has been described in conjunction with specific embodiments thereof, it is evident that many alternatives, modifications, and variations will be apparent to those skilled in the art. For example, this method of reducing the amount of colorant can be used in all types of color printers such as ink jet printers, laser printers and the like. Accordingly, the preferred embodiments of the invention as set forth herein are intended to be illustrative, not limiting. Various changes may be made without departing from the spirit and scope of the invention as defined in the following claims.

What is claimed is:

1. In a method of using two or more color colorants having different luminosities to print a process black area on a page, and where the amount of the colorants for the process black area is to be reduced, the improvement comprising:
   reducing the amount of the colorant having the higher luminance by a greater percentage.

2. The method of claim 1 wherein said non-black colorants comprise cyan, magenta, or yellow.

3. The method of claim 2 wherein said yellow colorant is the one that is reduced by the greater percentage.

4. In a method of using two or more color colorants having different luminosities and black colorant to print an edge between a colored background area and a process black area, and where the amount of colorant for the process black area is to be reduced, the improvement comprising:

reducing the colorant amount of the process black area by reducing by a greater percentage the amount of the colorant having the higher luminance.

5. The method of claim 4 wherein said colorants comprise cyan, magenta, or yellow.

6. The method of claim 5 wherein said yellow colorant is the one reduced by a greater percentage.

* * * * *